Patented Feb. 1, 1949

2,460,793

UNITED STATES PATENT OFFICE 2,460,793

ALKYLATION OF PHENOL BY ALKYL HALIDES CATALYZED BY FINELY DIVIDED GELS OF CERTAIN DRYING OILS

Charles J. Plank and John F. Socolofsky, Woodbury, N. J., assignors to Socony-Vacuum Oil Company, Incorporated, a corporation of New York No Drawing. Application November 18, 1944, Serial No. 564,175

5 Claims. (Cl. 260—624)

This invention relates to the catalytic alkylation of phenols and is more particularly concerned with the provision of new catalysts capable of promoting said alkylation reaction.

It is well known in the art, to effect a union between molecules of aromatic hydrocarbons and alkyl radicals to produce a product called an alkylate, which represents structurally the addition of the original aromatic hydrocarbon molecule and of the alkyl radical. The operation is called alkylation and the conditions of temperature, pressure, etc., are called alkylating conditions. In alkylation reactions, the alkyl radical may be furnished by olefinic hydrocarbons, by alkyl halides, by alcohols, or broadly, by any compound that, under the alkylation conditions of the operation, will produce the desired alkyl radical. These compounds are referred to in the art as alkylating agents, and in the interest of brevity, they will be so referred to hereinafter, it being clearly understood that the nature of the compound will become apparent to those versed in the art, from the character of the reactant used in any particular reaction.

It is also well known to those familiar with the art, that alkylation reactions may be conducted in the presence of substances that promote the alkylation reaction. These substances are referred to as alkylation catalysts and operations involving the use of the substances are known as catalytic alkylations, as distinguished from operations wherein no alkylation catalysts are employed, and which are referred to in the art as thermal alkylations.

A great variety of materials have been used as catalysts in the alkylation of aromatic hydrocarbons. For instance, it is known to alkylate aromatic hydrocarbons in the presence of metal halides, sulfuric acid, phosphoric acids, hydrogen fluoride, boron trifluoride, bases such as sodium hydroxide and calcium hydroxide, and so-called surface active materials such as silicic acid gels, natural and synthetic clays, and bleaching earths. Since under alkylating conditions, the catalytic activity of these alkylation catalysts appears to be predicated upon contact between the catalysts and the gaseous hydrocarbon reactants at the interfaces therebetween, in processes involving the use of these catalysts, the latter are used in appreciable amounts. Due to the relatively large amounts employed, where possible, recovery and regeneration of the catalyst are employed. This, of course, involves high initial and operation costs particularly where acid or basic catalysts are used.

We have discovered that gels obtained from drying oils are effective alkylation catalysts.

We have found that phenols may be alkylated with alkylating agents through the use of gels obtained from drying oils.

Accordingly, it is an object of the present invention to provide a process for alkylating phenols. Another object is to provide an efficient process for catalytically alkylating phenols. A more specific object is to afford a process capable of carrying out the above objects by using new alkylation catalysts. A very important object is to provide new alkylation catalysts. Other objects and advantages of the present invention will become apparent to those skilled in the art from the following description.

Broadly stated, the present invention provides a process for alkylating phenols, which comprises contacting a phenol with an alkylating agent, under alkylating conditions, in the presence of gels obtained from drying oils.

The new alkylation catalysts of our invention, are the hard, friable gels produced from drying oils, such as perilla oil, oiticica oil, dehydrated castor oil, China-wood oil and the like, as well as mixtures of these oils, by treatment of the oils or of mixtures thereof with boron trifluoride. China-wood oil may be converted into a similar gel by heat alone.

As is well known to those familiar with the art, these gels may be obtained by adding boron trifluoride or boron trifluoride-etherate (a convenient manner of handling boron trifluoride) to a drying oil or to a mixture of drying oils, in amounts that will produce a boron trifluoride-content in the oil ordinarily varying between about 0.02% and about 5%, based on the weight of the oil, followed by stirring until gellation is substantially complete. The gellation may be hastened, particularly where small amounts of boron trifluoride or of boron trifluoride-etherate are employed, by heating the resulting mixture to temperatures of up to about 400° F. When China-wood oil is used as the raw material, as stated hereinbefore, the gellation may be accomplished by heating the China-wood oil to temperatures varying between about 500° F. and about 600° F., and maintaining the oil at these temperatures until the desired degree of gellation is achieved. The gels obtained should be hard and friable in order that they may be ground into fine powders prior to use in the alkylation operations.

The following examples are given by way of illustration only, and are typical of the procedures involved in the preparation of our catalytic gels:

EXAMPLE 1

150 grams of China-wood oil were heated to a temperature of about 600° F. and kept at this temperature for about 5–6 minutes. The resulting gel was a sticky and viscous mass and in this state could not be comminuted. The mass was subjected to an extraction with ether and the resulting gel after removal of the ether could be readily ground into fine particles.

EXAMPLE 2

250 grams of China-wood oil were placed in a beaker and while stirring vigorously, a sufficient amount of boron trifluoride-etherate containing 45% of boron trifluoride by weight to yield a boron trifluoride-content of 0.2% based on the weight of the oil, was added from a measuring pipette. Stirring was stopped and the mixture was allowed to stand in the open beaker for two weeks. At the end of this time, the gel was sufficiently hard to be easily ground into fine dry particles.

EXAMPLE 3

300 grams of China-wood oil were placed in a beaker and while stirring vigorously, a sufficient amount of boron trifluoride-etherate to yield a boron trifluoride-content of 0.1% based on the weight of the oil, was added from a measuring pipette. Stirring was stopped and the mixture was allowed to stand overnight. The mixture which has not as yet gelled was heated at a temperature of 200° F. for 10 minutes and then was allowed to stand for another day. The gel thus obtained was quite hard and could be ground into a very fine white powder.

EXAMPLE 4

300 grams of China-wood oil were placed in a beaker and while stirring vigorously, a sufficient amount of boron trifluoride-etherate to yield a boron trifluoride-content of 0.6% based on the weight of the oil, was added from a measuring pipette. Stirring was stopped and the mixture after standing overnight gelled into a hard friable gel which could be ground into a fine white powder.

EXAMPLE 5

300 grams of China-wood oil were placed in a beaker and while stirring vigorously, a sufficient amount of boron trifluoride-etherate to yield a boron-trifluoride content of 1.0% based on the weight of the oil, was added from a measuring pipette. Stirring was stopped and the mixture after standing overnight gelled into a hard friable gel which could be ground into a fine white powder.

EXAMPLE 6

200 grams of oiticica oil were placed in a beaker and while stirring vigorously, a sufficient amount of boron trifluoride-etherate containing 45% of boron trifluoride by weight to yield a boron trifluoride-content of about 5% based on the weight of the oil, was added dropwise from a measuring pipette. In spite of the vigorous stirring, a certain amount of gellation occurred before all the boron trifluoride-etherate was added. Gellation was complete by the time all the boron trifluoride-etherate was added. The gel was allowed to set for two to three hours and then was ground in a roller mill into fine particles.

The products obtained in Examples 1 through 5 were very nearly white in color, while the gel particles obtained in Example 6 were very nearly black in color. Ordinarily, all gels prepared by treatment of the drying oils with boron trifluoride in such amounts that the boron trifluoride-content of the oil is below about 1% by weight, will be practically white in color, when ground into fine particles. As the boron trifluoride-content increases above about 1%, the color will become increasingly darker, and generally speaking, the gels will harden at a faster rate. All the gels are hard and substantially insoluble in all organic solvents.

In accordance with the present invention, the oil gel particles find particular application in promoting the alkylation of phenols. In these alkylation operations, the gel particles are used as contact catalysts. Without limiting the scope of our invention, it is likely that the oil gel catalysts are active as alkylation catalysts in the same fashion as the surface-active catalysts, such as the silicic acid gels, natural and activated clays, alumina and the like. They possess all the advantageous properties of these catalysts of the prior art, and have the additional advantage of requiring no extensive and/or expensive regeneration treatments. Also, while moisture has detrimental effects on catalysts such as activated clays, alumina, and the like, our oil gel catalysts are not affected by moisture.

The use of our oil gel catalysts in alkylation operations has also inherent advantages over the use of acid catalysts and of basic catalysts. The use of the latter types of catalysts necessitates employing expensive equipment and costly regeneration procedures, thereby increasing initial and operation costs. Neither of these disadvantages are extant in the use of our oil gel catalysts.

It must be noted further, that in many catalytic alkylation operations wherein metal halides are employed as the catalysts, substantial amounts of these catalysts are consumed in the course of the reactions involved. Our oil gel catalysts are not affected by the reactions involved in alkylation operations and may be reused without apparent loss of catalytic activity.

It is important to note that the alkylation catalytic activity of our oil gels does not appear to depend upon the boron trifluoride-content of the gels. This is clearly indicated by the fact that heat-bodied China-wood oil gels are just as efficient as alkylation catalysts as the boron trifluoride-bodied China-wood oil gels.

The amounts of our drying oil gel catalysts used in the alkylation process of the present invention, ordinarily vary between about 1% and about 25% with respect to the weight of the reactants in the charge. Larger amounts may be used, if desired, although no additional advantages seem to result therefrom.

Any aromatic compound in which one or more hydrogen atoms in an aromatic nucleus have been replaced by a hydroxyl group (phenols) may be used as the alkylatable reactant. Phenol, catechol cresol, picric acid, aminophenol, naphthol, bromophenol, hydroquinone, and nitrophenol may be mentioned by way of non-limiting examples.

Generally speaking, the alkylating agents to be used in our process are compounds which under the alkylation conditions of the process will produce the desired alkyl radical or radicals. Alkyl halides, olefinic hydrocarbons, and alcohols are examples of broad classes of compounds suitable as alkylating agents. Usually we prefer to execute the alkylation operation, with the alkylating agent present in the mixture undergoing treatment, in amounts varying between about 1% and about 25% based on the weight of the charge. The following compounds are mentioned by way of non-limiting example only, and are illustrative of the alkylating agents suitable for our process: ethylene, propylene, butylenes, amylenes, ethyl alcohol, normal propyl alcohol, isopropyl alcohol, amyl alcohol, ethyl chloride, propyl bromide, and butyl chloride.

The alkylation conditions of our process, comprise temperatures that usually vary between about 100° F. and about 600° F., and preferably, between about 200° F. and about 500° F. Any suitable pressure may be used depending upon the temperature, the nature of the reactants, and upon whether the reaction is effected in the vapor or liquid phase. When the operation is carried out with the reactants in the vapor phase, the vapors of the reactants are passed under the desired pressure and at suitable space velocities into contact with the drying oil gel particles in a reaction zone maintained at the desired temperature. The fluids leaving the reaction zone may be cooled and the condensed material conducted to a recovery zone wherein separation of the alkylate from other materials, if they are present, may be effected by distillation, extraction, and other well known means. When the material to be alkylated is unstable at its atmospheric boiling temperature, subatmospheric pressures are advantageously used. Generally, we prefer to effect the alkylation operation in the liquid phase and we have found that pressures varying between atmospheric pressure and about 100 pounds per square inch are suitable, although lower or higher pressures may be used when necessary or desirable. The time of reaction depends primarily upon the temperature, upon the nature of the reactants in the charge, and to a certain extent upon the pressure employed. In batch operation, we have found that treatment at temperatures of about 300° F., under atmospheric pressure, for a period of time upwards of about 2 hours is sufficient to produce alkylate in good yields.

It must be understood, of course, that the reaction variables are more or less interdependent; hence, when one is arbitrarily fixed, the limits within which the others may be varied are somewhat restricted. In any particular instance, the most desirable conditions can be readily ascertained by one skilled in the art, the working ranges of these variables having been indicated hereinbefore.

In carrying out the alkylation process of our invention, the reactants may be charged individually or in admixture into a suitable reaction vessel. The required amount of catalytic oil gels may be added before, during or after introduction of the reactants. Ordinarily, the reaction vessel should be equipped with means for agitating its contents to maintain the catalytic oil gels in suspension.

The following detailed examples are submitted for the purpose of illustrating modes of carrying out the process of our invention. It is to be understood that the invention is not to be considered as limited to the specific modes or conditions of operation set forth therein. By suitable modification of conditions and reactants, a wide variety of other compounds and mixtures may be prepared.

EXAMPLE 7

A mixture of 100 grams of phenol and 23 grams of finely ground oiticica oil gel obtained in the test set forth in Example 6 was placed in a 3-neck flask equipped with a reflux condenser, a thermometer, and a dropping funnel. 50 grams of tertiary butyl chloride were placed in the dropping funnel. The mixture of phenol and oiticica oil gel was heated to a temperature of about 300° F. and while at this temperature, the tertiary butyl chloride was added dropwise over a period of 1½ hours.

The mixture was then permitted to cool to a temperature of about 210° F., and after the addition of water, the mixture was refluxed for an hour. The mixture was subsequently filtered and 26 grams of a dark, water-insoluble liquid were separated and recovered from the filtrate. The residue was washed with ether and the ether extract was combined with the dark, water-insoluble liquid. The mixture thus obtained, after topping off the ether was subjected to an extraction treatment with 5% sodium hydroxide. 24 grams of a material insoluble in sodium hydroxide were recovered. The predominant portion of the 24 grams proved to be insoluble in 33% sodium hydroxide, showing definite proof of di- and trialkylation. A portion of this product (unknown A) was reacted with chloroacetic acid to yield an aryloxyacetic acid melting at 284–285.8° F. Upon analysis, as set forth in Table I, the aryloxyacetic acid proved to be o-tertiary-butylphenoxyacetic acid.

Table I

| Chloroacetic derivative of— | Melting Point in °F. | Percent Carbon | Percent Hydrogen | Neutralization Equivalent |
|---|---|---|---|---|
| p-tertiary butyl phenol | 187.9 | 69.2 | 7.70 | 208 |
| o-tertiary butyl phenol | ? | 69.2 | 7.70 | 208 |
| Unknown A | 284–285.8 | 69.3 | 7.77 | 209 |

The alkali extract was neutralized with sodium bicarbonate and then extracted with ether. The ether was evaporated from the extract and the latter was subjected to distillation. The material coming off above 460° F. (the boiling point of p-tertiary-butyl-phenol) was assumed to be substituted phenols, and that below 460° F., to be essentially phenol. The first distillate collected at 460° F. was cooled, whereupon, a small amount of crystalline material separated out. The crystalline material had a melting point of 206.60 F. indicating, therefore, that it was p-tertiary-butyl phenol (melting point of 210–212° F.); however, the yield was very small. Later portions of the distillate yielded a chloroacetic acid derivative having a melting point of 284–285.8° F. indicating that it was o-tertiary-butylphenoxyacetic acid. The distillate collected and boiling above 460° F. weighed 20 grams, which together with the 24 grams originally collected and insoluble in sodium hydroxide, constitutes a total weight of 44 grams of alkylated phenols, equivalent to a 54% yield, based on the maximum theoretical yield of monoalkylated phenols possible from the quantity of t-butyl chloride consumed.

EXAMPLE 8

A mixture of 285 grams of tertiary-butyl chloride, 285 grams of phenol, and 50 grams of finely ground oiticica oil gel obtained in the test set forth in Example 6 was placed in a 3-neck flask equipped with a thermometer and a reflux condenser. The mixture was refluxed for 6 hours, during which time, the reflux temperature rose from 127.4° F. to 230° F. The catalytic gel was separated from the mixture in the flask, and the resulting product was then fractionated. The results are set forth in Table II:

Table II

| Fraction No. | Temperature in °F. | Pressure in mm. | Weight in Grams | Principal Constituent |
|---|---|---|---|---|
| 1 | 228.2–244.4 | 40 | | Phenol. |
| 2 | 248.0–255.2 | 6 | 300 | p-tertiary-butyl phenol. |
| 3 | 266.0–275.0 | 3 | 26 | Polyalkylated phenols. |

Fraction 1 proved to be largely phenol. However after repeated extraction with water at 212° F., almost 35 grams of p-tertiary-butyl phenol was recovered therefrom.

Fraction 2 was dried on a porous plate and yielded a crystalline solid having a melting point of 190.4–194° F. This crystalline solid was purified by recrystallizing twice from petroleum ether, and the purified product had a melting point of 208.4–210.2° F. A mixed melting point determination was made using known p-tertiary-butyl phenol and this gave a melting point of 206.6–210.2° F., thereby indicating that fraction 2 was substantially pure p-tertiary-butyl phenol. The total yield of p-tertiary butyl phenol was 70% of the theoretical, based on the amount of t-butyl chloride consumed.

Fraction 3 had a deep orange color, had the odor of tri-tertiary-butyl phenol, and was completely insoluble in 33% sodium hydroxide. Attempts to purify and crystallize the constituents of the fraction were unsuccessful, indicating that the fraction was undoubtedly a mixture of the di- and tri-alkylated phenols.

The total yield of alkylated products was 80% of the theoretical, based on the amount of t-butyl chloride consumed.

EXAMPLE 9

A mixture of 300 grams of tertiary-butyl chloride, 325 grams of phenol, and 50 grams of finely ground heat-bodied China-wood oil gel obtained in the test set forth in Example 1 was treated in the same manner as described in Example 8. However, in this test, the refluxing time was 10½ hours, during which the reflux temperature rose from 143.6° F. to 248° F. The catalytic gel was separated from the mixture in the flask, and the resulting product was then fractionated at atmospheric pressure. The results are tabulated in Table III:

Table III

| Fraction No. | Temperature in °F. | Weight in Grams |
|---|---|---|
| 1 | 356.0–410.0 | 25 |
| 2 | 410.0–428.0 | 12 |
| 3 | 428.0–437.0 | 7 |
| 4 | 437.0–442.4 | 90.5 |
| 5 | 442.4–456.8 | 13.5 |
| 6 | 456.8–460.4 | 62 |
| 7 | 473.0–491.0 | 16 |
| 8 | residue | 13 |

Since fractions 4 and 6 were obviously the main products, they were identified. Fraction 4 was a liquid that formed a derivative with chloracetic acid having a neutralization equivalent of 211 and a melting point of 284–285.8° F. The derivative was o-tertiary-butylphenoxyacetic acid, and fraction 4, therefore, was o-tertiary-butyl phenol.

Fraction 6 was a solid that had a melting point of 208.4–210.2° F., and formed a derivative with chloracetic acid that had a neutralization equivalent of 217 and a melting point of 185.0–186.8° F. as compared to a melting point of 187.9° F. for p-tertiary-butylphenoxyacetic acid. Therefore, fraction 6 was p-tertiary-butyl phenol.

The data tabulated in Table III indicates that the total yield of alkylated phenols was 46%, based upon the amount of tertiary butyl chloride consumed, and that the yield of monoalkylated phenols was 40%, based upon the amount of tertiary butyl chloride consumed.

EXAMPLE 10

A mixture of 300 grams of tertiary butyl chloride, 304 grams of phenol, and 45 grams of finely ground heat-bodied China-wood oil gel obtained in the test set forth in Example 1, but which had hardened for five weeks longer than the China-wood oil gel used in the test set forth in Example 9, was treated in the same manner as described in Example 8. However, in this test, the refluxing time was 18 hours, during which the reflux temperature rose from 145.4° F. to 320.0° F. The catalytic gel was separated from the mixture in the flask, and the resulting product was then fractionated. The results are tabulated in Table IV:

Table IV

| Fraction No. | Temperature in °F. | Weight in Grams |
|---|---|---|
| 1 | 356.0–359.6 | 117 |
| 2 | 359.6–429.8 | 14 |
| 3 | 429.8–437.0 | 108 |
| 4 | 437.0–455.0 | 20 |
| 5 | 455.0–464.0 | 55 |
| 6 | 464.0–491.0 | 14 |
| 7 | above 491.0 | 43 |

Fractions 3 and 5 proved to be o- and p-tertiary-butyl phenol, respectively. These data indicate that the total yield of alkylated phenols was 53%, based upon theoretical yield of 486 grams of monoalkylated phenols, and that the yield of monoalkylated phenols was 41%, based upon theoretical yield of 486 grams of monoalkylated phenols.

EXAMPLE 11

A mixture of 300 grams of tertiary butyl chloride, 325 grams of phenol, and of 50 grams of finely ground boron trifluoride-bodied China-wood oil gel obtained in the test set forth in Example 2 was treated in the same manner as described in Example 8. However, in this test, the refluxing time was 19 hours, during which the reflux temperature rose from 131.0° F. to 275° F. The catalytic gel was separated from the mixture in the flask, and the resulting product was then fractionated at atmospheric pressure. The results are tabulated in Table V:

Table V

| Fraction No. | Temperature in °F. | Weight in Grams |
|---|---|---|
| 1 | 356.0–361.4 | 134 |
| 2 | 361.4–426.2 | 19 |
| 3 | 426.2–435.2 | 122 |
| 4 | 435.2–455.0 | 12 |
| 5 | 455.0–464.0 | 65 |
| 6 | 464.0–482.0 | 5 |
| 7 | 482.0–500.0 | 19 |
| 8 | residue | 56 |

Fractions 3 and 5 proved to be o- and p-tertiary butyl-phenol, respectively. These data indicate that the total yield of alkylated phenols was 60%, based upon the amount of tertiary butyl chloride consumed, and that the yield of monoalkylated phenols was 43%, based upon the amount of tertiary butyl chloride consumed.

EXAMPLE 12

A mixture of 300 grams of tertiary butyl chloride, 304 grams of phenol, and 50 grams of the boron trifluoride-bodied China-wood oil gel catalyst used in the test set forth in Example 11 was treated in the same manner as described in Example 8. However, in this test, the refluxing time was 32 hours, during which the reflux temperature rose from 140.0° F. to 257.0° F. The catalytic gel was separated from the mixture in the flask, and the resulting product was then fractionated at atmospheric pressure. The results are tabulated in Table VI:

Table VI

| Fraction No. | Temperature in °F. | Weight in Grams |
| --- | --- | --- |
| 1 | 356.0–359.6 | 148 |
| 2 | 359.6–428.0 | 49 |
| 3 | 428.0–437.0 | 104 |
| 4 | 437.0–455.0 | 13 |
| 5 | 455.0–464.0 | 8 |
| 6 | 464.0–482.0 | 19 |
| 7 | 482.0–491.0 | 3 |
| 8 | residue | 15 |

Fraction 3 proved to be o-tertiary-butyl phenol. The data in Table VI indicate that the total yield of alkylated phenols was 38% based upon the amount of tertiary butyl chloride consumed, and that the yield of o-tertiary-butyl phenol was 28% based upon the amount of tertiary butyl chloride consumed.

The products obtained from the alkylation of phenols are widely used in the production of oil-soluble synthetic resins and in the manufacture of lubricating oil additives.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. A process for alkylating phenol, which comprises refluxing equimolar portions of phenol and a tertiary alkyl halide, in the presence of a drying oil gel selected from the group consisting of boron trifluoride-bodied China-wood oil gel, boron trifluoride-bodied oiticica oil gel, and heat-bodied China-wood oil gel.

2. A process for alkylating phenol, which comprises refluxing equimolar portions of phenol and a tertiary alkyl chloride, in the presence of a heat-bodied China-wood oil gel.

3. A process for alkylating phenol, which comprises refluxing equimolar portions of phenol and a tertiary alkyl chloride, in the presence of a boron trifluoride-bodied oiticica oil gel.

4. A process for alkylating phenol, which comprises refluxing equimolar portions of phenol and tertiary butyl chloride, in the presence of a heat-bodied China-wood oil gel.

5. A process for alkylating phenol, which comprises refluxing equimolar portions of phenol and tertiary butyl chloride, in the presence of a boron trifluoride-bodied oiticica oil gel.

CHARLES J. PLANK.
JOHN F. SOCOLOFSKY.

REFERENCES CITED

The following references are of record in the file of this patent:

UNITED STATES PATENTS

| Number | Name | Date |
| --- | --- | --- |
| 2,161,826 | Kyrides | June 13, 1939 |
| 2,260,417 | Whiteley | Oct. 28, 1941 |
| 2,316,187 | Pratt | Apr. 13, 1943 |